United States Statutory Invention Registration [19]

[11] Reg. Number: H679

Czajkowski, Jr. [43] Published: Sep. 5, 1989

[54] FOLDABLE TOWABLE THERMAL AND RADAR VEHICULAR DECOY

[75] Inventor: Edward H. Czajkowski, Jr., Ellicott City, Md.

[73] Assignee: The United States of America as represented by the Secretary of the Army, Washington, D.C.

[21] Appl. No.: 172,534

[22] Filed: Mar. 24, 1988

[51] Int. Cl.[4] ..... H04K 3/00

[52] U.S. Cl. ..... 342/13; 342/9; 342/10

[58] Field of Search ..... 342/13, 3, 4, 8, 9, 342/10, 5

[56] References Cited

U.S. PATENT DOCUMENTS

| | | | |
|---|---|---|---|
| H,308 | 7/1987 | Tutin et al. | 342/4 |
| 3,546,983 | 10/1985 | Rosa | 342/9 X |
| 4,019,699 | 4/1977 | Wintersdorff et al. | 342/5 X |
| 4,287,243 | 9/1981 | Nielsen | 342/3 X |
| 4,659,089 | 4/1987 | Rosa | 342/9 X |
| 4,733,236 | 3/1988 | Matosian | 342/7 |

*Primary Examiner*—Thomas H. Tarcza
*Assistant Examiner*—Linda J. Wallace
*Attorney, Agent, or Firm*—Walter R. Baylor; Saul Elbaum; Guy M. Miller

[57] ABSTRACT

To provide for ease of movement, a decoy capable of misleading smart munitions having both radar and thermal sensors utilizes a frame having two sections, with one foldable over the other. On this frame are mounted a plurality of thermal panels for generating representative thermal signatures. In a first embodiment, the order not to interfere with the folding of the frame, a number of hollow polyhedrons used for reflecting radar waves are mounted invertedly onto the frame. In a second embodiment, a number of reflectors, each having in turn a plurality of collapsible right triangular elements, are used for reflecting the radar waves. For this embodiment, since the members of the reflectors are collapsible and would not interfere with the folding of one section of the frame on the other, the reflectors are mounted in an upright position.

13 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FOLDABLE TOWABLE THERMAL AND RADAR VEHICULAR DECOY

RIGHTS OF THE GOVERNMENT

The invention described herein may be manufactured, used and licensed by or for the United States Government for governmental purposes without the payment to me of any royalty thereon.

FIELD OF THE INVENTION

The present invention relates to a decoy for misleading smart munitions having thermal and radar sensors, and particularly to a decoy which can be easily compacted and relocated.

BACKGROUND OF THE INVENTION

As described in co-pending application Ser. No. 07/172,533, filed Mar. 24, 1988, entitled "Movable Thermal and Radar Vehicular Decoy" by the same inventor and assigned to the same assignee, several new anti-vehicular smart munitions utilize sensors that are either thermal, radar waves of millimeter wavelengths or a combination of both. Heretofore, an easily transportable decoy which could attract or confuse these types of munitions, and thereby increasing the survivability of the armored vehicle to which the decoy is paired, was not available.

The aforementioned co-pending application pertains to a decoy which can mislead both radar and thermal sensors on a smart munition. To achieve this end, the co-pending application decoy has a platform mounted on a trailer. The platform is coated with a metallic layer which, when struck by radar waves, would reflect the same to produce a millimeter wavelength signature. The platform has at least one upraised portion for enhancing the reflection of the radar waves and also to allow the decoy to be used against airborne smart munitions. On selected portions of the platform are mounted thermal panels whose heat outputs can be independently regulated by a control means so that the panels as a whole would generate a contrast heat pattern corresponding to the thermal signature of a chosen armored vehicle. Thus, the co-pending application decoy is able to provide for both thermal and millimeter wavelength radar signatures representative of a particular type of armored vehicle which it is simulated to become. However, in order to provide for the correct signatures, the size of the platform has to be substantial, resulting in the decoy becoming quite bulky. This, in turn, leads to a decoy which, although transportable, is quite difficult to haul, since in most instances, the terrain in which the decoy is to operate is inhospitable for movements.

Therefore, a decoy which can be compacted so as to be less bulky during transportation is required.

BRIEF DESCRIPTION OF THE PRESENT INVENTION

The present invention decoy has a trailer on which is mounted a frame made up of tubular members. Fixedly mounted to the frame are a plurality of thermal panels for generating a thermal signature representative of the chosen type of armored vehicle. Mounted at each corner of the frame is a reflector. For a first embodiment of the invention, the reflectors are hollow wedge-shaped polyhedrons mounted invertedly on the frame, with their apexes pointing toward the ground. For reflecting the radar waves, the interior surfaces of the polyhedrons are used. The frame has a collapsible section which, in transport, is folded over so that the size of the frame is substantially reduced. And since the reflectors are pointed downwards, the frame can easily be folded in half for transport.

In a second embodiment, instead of hollow polyhedrons, the reflectors are made of a plurality of collapsible members which, upon the folding of the frame, would collapse coplanarly so that no obstruction is caused thereby. To operate, after the frame has been unfolded, the collapsible members of the reflectors are extended in their respective upright positions, with the surfaces of the members acting to reflect the radar waves.

Thus, by using either embodiment, the present invention is able to achieve the objective of providing for a compact decoy that is readily transportable.

The above-mentioned objects and advantages of the present invention will be more clearly understood when considered in conjunction with the accompanying drawings, in which:

DESCRIPTION OF THE PREFERRED EMBODIMENTS

Figure 1:
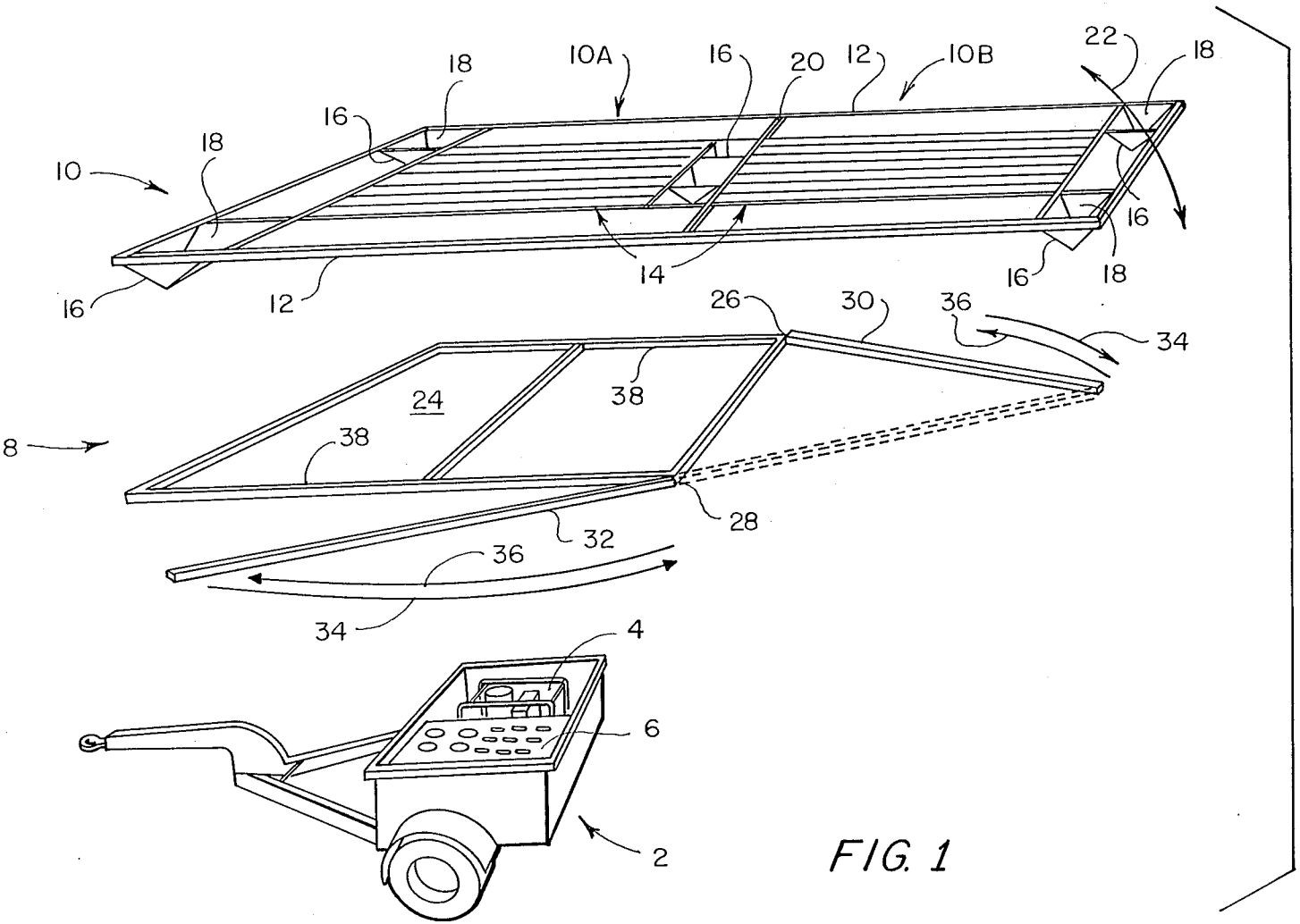
FIG. 1 is a perspective view of the first embodiment of the present invention decoy.

Referring to FIG. 1, there is shown a first embodiment of the present invention decoy. Same as in the aforementioned co-pending application by the same inventor, the present invention decoy has a carrier means, for example, a trailer 2. Within trailer 2 are a generator 4 and a controller 6 for regulating the current from generator 4. Superposed over trailer 2 is a supporting frame 8, which in turn has superposed thereover a frame 10.

Focus now on frame 10. As shown, frame 10 is comprised of a number of tubular members 12, which together, for this embodiment, form a grid frame having different portions. In the two approximately central grid portions of frame 10 are fixedly mounted a plurality of thermal panels 14. It should be appreciated that, although shown as two sections, these thermal panels may actually be comprised of a number of panels placed end to end. By means of cables (not shown) connected to generator 4 by means of controller 6, these panels are energized, independently controlled by controller 6 in terms of the current fed thereto. Consequently, each one of these panels may emit a different amount of heat. Therefore, taken altogether, the combination thermal panels would generate a contrast heat pattern which substantially represents the thermal signature of an armored vehicle, for example, a tank. It should be appreciated that, even though the thermal panels are shown positioned approximately in the center of frame 10, in actuality these panels may be positioned in different portions of frame 10 so as to more accurately represent the thermal signature of the armored vehicle it is to mimic.

For this embodiment, a reflector in the shape of a hollow wedge-shaped polyhedron 16 is mounted at each corner of frame 10. An additional reflector is mounted at the proximate center thereof. As shown, these polyhedrons are invertedly mounted such that the apexes thereof are pointing downward. These polyhedrons are made of metallic materials and are meant to reflect radar waves incident to the interior surfaces thereof, designated for example by 18.

For this embodiment, frame 10 is divided into two sections, 10A and 10B, at junction 20 by hinges. Accordingly, section 10B is foldable in the direction designated by arrow 22. Since reflectors 16 are invertedly mounted, there would not be any interference between the reflectors when section 10B is folded over so as to rest on section 10A. The purpose of reflectors 16 is to, as was mentioned previously, reflect any radar waves directed at the present invention decoy. The reflected waves, most likely, are in the range of millimeters. The sizes and configurations of the reflectors may be changed so as to proximately represent the passive radar signature of the chosen armored vehicle. Therefore, the reflectors, in conjunction with the thermal panels, provide, passively and actively, respectively, radar and thermal signatures mimicking that of a particular armored vehicle.

For this embodiment, to support frame 10, support frame 8 is used. As shown, support frame 8 is made of a base frame 24 which has connected at junctions 26 and 28 thereof, by hinges, respective collapsible members 30 and 32. These members are extended in the direction designated by arrows 34 and are locked in a cantilevered position for supporting section 10B of frame 10, when section lOB has been extended fully. When section 10B has been folded on top of section 10A, for transit for example, members 30 and 32 are collapsed in the direction shown by arrows 36 so as to line up alongside of members 38 of base frame 24.

Figures 2, 3:
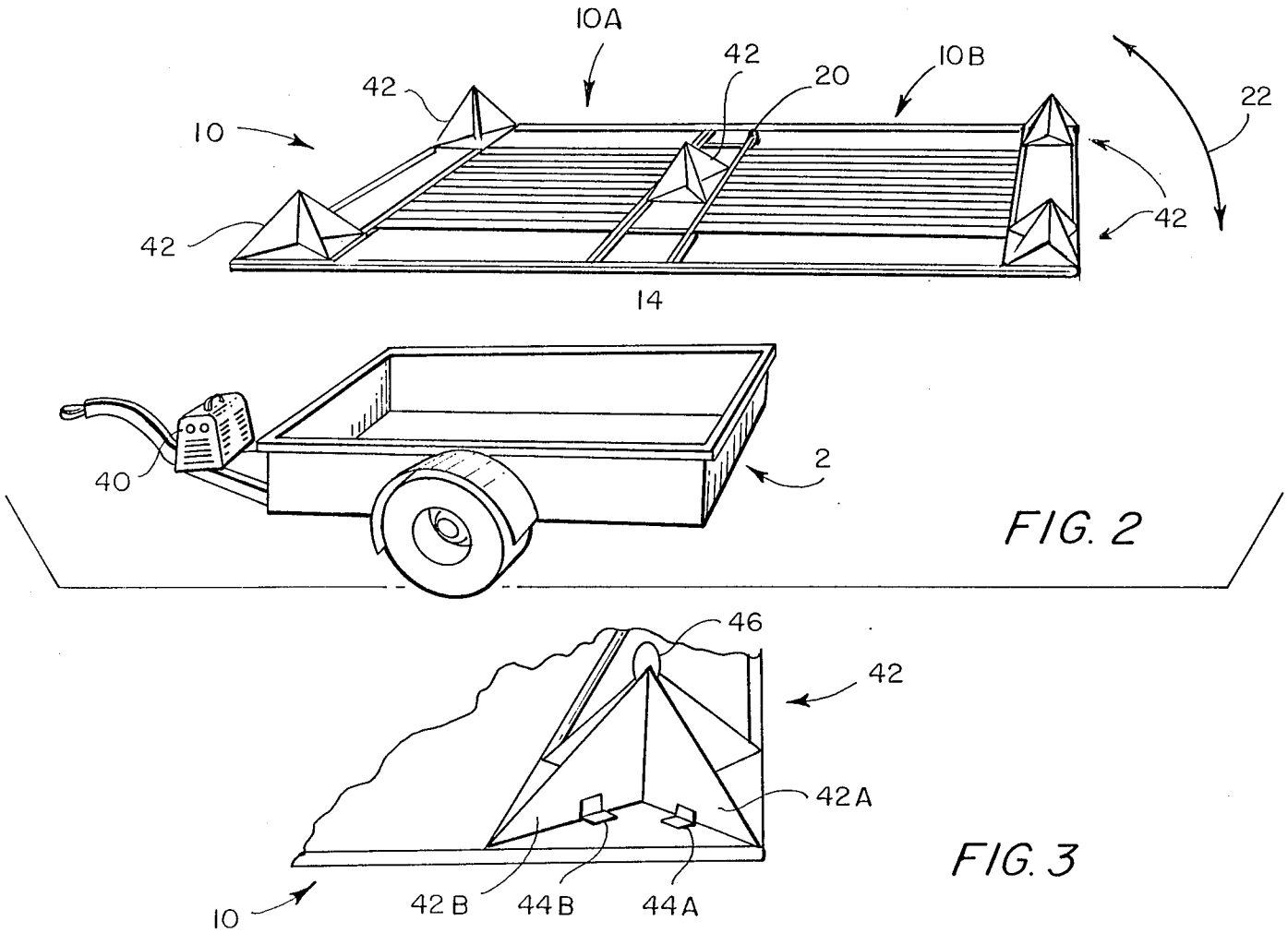
FIG. 2 is a perspective view of a second embodiment of the present invention decoy.
FIG. 3 is an enlarged view of one of the reflectors of the FIG. 2 present invention decoy embodiment.

A second embodiment of the present invention decoy is shown in FIG. 2. For this embodiment, the power generator and controller are shown as being incorporated into a single unit 40 situated on the pintle outside of trailer 2. Although shown as such, it should be appreciated that the location, or the types of generator and controller, are not of particular import in the present invention decoy. As in the first embodiment, frame 10 is made up of a number of tubular members and is divided into sections such that air can circulate into trailer 2 through the open grids. As before, thermal panels 14 are fixedly mounted onto respective sections 10A and lOB, with section 10B again foldable in the direction designated by arrow 22 via the hinges at junction 20. But instead of invertedly mounted hollow polyhedrons, each one of the reflectors 42 of the second embodiment has a plurality of collapsible right triangular-shaped members for reflecting at the millimeter wavelength range the radar waves directed at the decoy. Similar to the first embodiment, in addition to a reflector mounted at the proximate center, a reflector is mounted at each corner of frame 10 for providing an outline of the decoy. Similar to the reflectors in the first embodiment, the size and the location of reflectors 42 on frame 10 can vary so as to represent more accurately the millimeter wavelength signature of a particular armored vehicle.

The construction of reflector 42 is shown in greater detail in FIG. 3. There, it is seen that each member of reflector 42 is in the shape of a right triangle. Looking at member 42A and 42B in particular, it can be seen that these members are connected to frame 10 by means of hinges 44A and 44B. In their upright positions, the right triangular members are held stationary by clip 46 so that one side of each is contiguous to the others. To rapidly transport the present invention decoy (assuming that there is no need at the moment to confuse on-coming smart munitions) and to ensure that section 10B is foldable over section 10A, clip 46 is removed and the right triangular members are collapsed onto frame 10 via hinges 44A and 44B. It should be appreciated that the construction of reflectors 42 is conventional and it is well documented that such reflectors are capable of reflecting radar waves at the millimeter wavelength range. Therefore, the combination of thermal panels 14 and reflectors 42 would provide both thermal and radar signatures corresponding to a particular armored vehicle.

Figure 4:
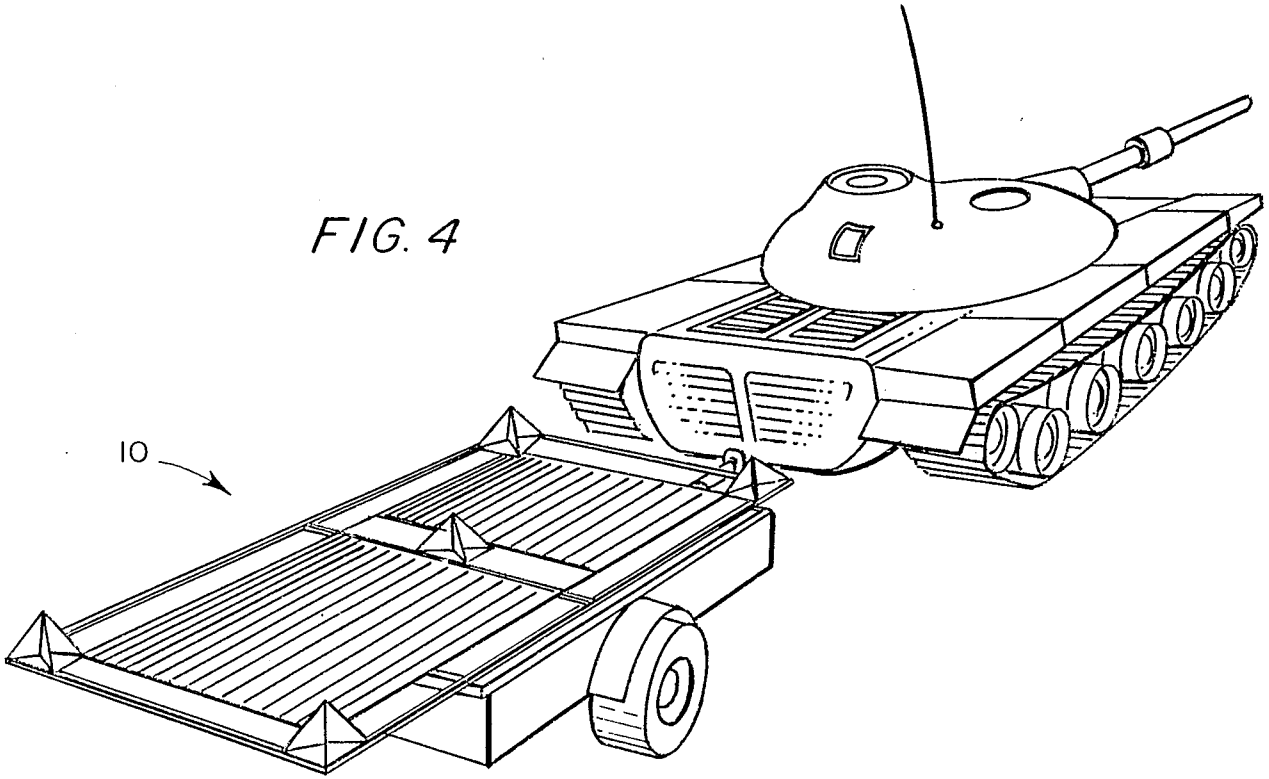
FIG. 4 illustrates the present invention decoy in transit.

The present invention decoy, like that of the co-pending application, can be used to mislead and confuse smart munitions having radar or thermal sensors, or a combination of both, in two ways. For example, the present invention decoy may be towed by an armored vehicle, for example, a tank, as shown in FIG. 4. In this usage, the decoy can either confuse the smart munitions so as to cause it not to fire on the tank or, conversely, cause it to miss the vital areas of the tank as the center of mass is changed by the addition of the decoy to the tank. Secondly, the present invention decoy may be towed to a designated area where smart munitions may mistake it for the tank. For this instance, since the idea is to transport the decoy to the designated area as soon as possible, the present invention foldable decoy, due to its compactness, would provide for greater ease of mobility than the decoy described in the co-pending application.

Having thus described the invention in detail, it should be understood that the present invention is not limited to the exact details of construction shown and described herein, for obvious modifications would occur to persons skilled in the art.

I claim:

1. Apparatus for misleading thermal and radar sensors in search of a target having particular thermal and radar wave reflector signatures, the apparatus comprising:

movable carrier means including power means and means for controlling the energy supplied by the power means;

a foldable planar frame positioned above the carrier means, the planar frame having a main section and a collapsible section which, when unfolded, provides for a fully extended planar frame, and which, when folded to rest on the main section, provides for a compact planar frame that can easily be transported by the movable carrier means;

a plurality of heat generating means fixedly mounted onto the frame at selected portions thereof, each of the heat generating means being powered by the power means and the heat of each of the heat generating means being independently regulated by the control means, the plurality of heat generating means producing, in combination, a thermal signature sought by the thermal sensor;

at least one radar wave reflective means invertedly fixed to the frame so as not to interfere with the folding of the frame, the reflective means providing a radar signature sought by the radar sensor by reflecting radar waves directed to the apparatus when the planar frame is fully extended;

wherein the combination of the heat generating means and the radar wave reflective means produces the thermal and radar wave signatures for identifying the apparatus as the target to the sensors; and whereupon the folding of the frame, the apparatus may be easily relocated.

2. Apparatus according to claim 1, wherein the radar wave reflective means comprises a hollow wedge-shaped polyhedron, the interior surfaces of which is used to reflect radar waves incident thereon.

3. Apparatus according to claim 2, further comprising a reflective means invertedly mounted to each corner of the frame and a reflective means invertedly mounted at proximate center of the frame for outlining the apparatus when the frame is fully extended.

4. Apparatus according to claim 1, further comprising a support frame interposed between the foldable planar frame and the movable carrier means for rigidly supporting the planar frame on the carrier means.

5. Apparatus according to claim 4, wherein the support frame has collapsible members which, when extended, provide support for the collapsible section of the foldable frame, the collapsible section having been unfolded and the planar frame being fully extended.

6. Apparatus according to claim 1, wherein the heat generating means comprises a thermal panel having a heat output corresponding to the amount of current supplied by the power means; and wherein the plurality of heat generating means produces a contrasting heat pattern substantially representative of the target thermal signatures.

7. Apparatus according to claim 1, wherein the planar frame comprises a plurality of interconnected tubular members.

8. Apparatus for misleading smart munitions having thermal and radar sensors, comprising:

movable carrier means including power means and means for controlling the power outputted from the power means;

a foldable planar frame positioned over the carrier means, the planar frame having a main section and a collapsible section which, when unfolded, provides for a fully extended planar frame, and which, when folded to rest on the main section, provide for a compact planar frame that can easily be transported by the movable carrier means;

a plurality of heat generating means fixedly mounted on the frame at selected portions thereof, the heat generating means being powered by the power means and the heat of each of the heat generating means being independently requlated by the control means, the plurality of heat generating means producing, in combination, a thermal signature sought by the thermal sensor;

at least one radar wave reflective means fixed to the frame, the reflective means including a plurality of collapsible members which, when extended in their respective upright positions, form a multi-surface reflector for reflecting radar waves incident thereon, the collapsible members being foldable onto the planar frame so as not to interfere with the folding of the planar frame collapsible section;

wherein the combination of the heat generating means and the reflective means produces the thermal and radar wave signatures for identifyting the apparatus as a target to the sensors; and whereupon the folding of the collapsible members of the reflective means and the folding of the planar frame collapsible section, the apparatus may easily be relocated.

9. Apparatus according to claim 8, wherein the heat generating means comprises a thermal panel having a heat output corresponding to the amount of current supplied by the power means; and wherein the plurality of heat generating means produces a contrasting heat pattern substantially representative of the target thermal signatures.

10. Apparatus according to claim 8, wherein the reflective collapsible members are right triangular-shaped metallic plates which, when extended in their respective upright positions, have one common contiguous side for forming a cross-shaped reflector.

11. Apparatus according to claim 10, further comprising means for securing the metallic plates in their respective upright positions.

12. Apparatus according to claim 8, further comprising a reflective means mounted to each corner of the planar frame and a reflective means mounted at proximate center of the frame for outlining the apparatus.

13. Apparatus according to claim 8, wherein the planar frame comprises a plurality of tubular members.

* * * * *